Figure 1:
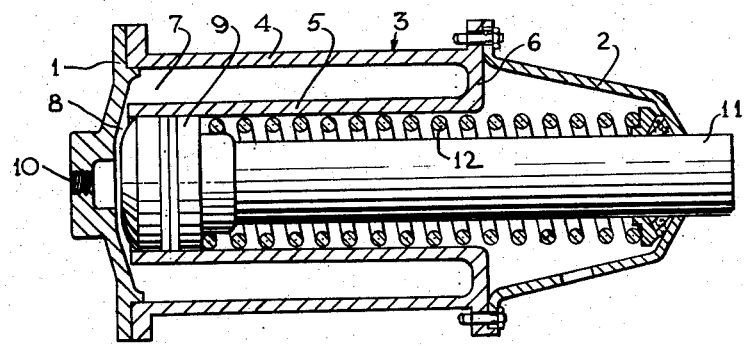

March 31, 1959 W. C. LANDIS 2,880,043
CONVERSION BRAKE CYLINDER
Filed May 23, 1955

INVENTOR.
William C. Landis
BY
Adelbert A. Steinmiller
ATTORNEY

United States Patent Office 2,880,043
Patented Mar. 31, 1959

2,880,043

CONVERSION BRAKE CYLINDER

William C. Landis, Pittsburgh, Pa., assignor to Westinghouse Air Brake Company, Wilmerding, Pa., a corporation of Pennsylvania Application May 23, 1955, Serial No. 510,180

2 Claims. (Cl. 309—3)

This invention relates to brake cylinder devices and, more particularly, to means for readily and inexpensively converting existing brake cylinder devices whereby to enable the use of molded brake shoes with existing railway braking equipment in place of customary cast iron brake shoes.

The molded type brake shoe, as referred to herein, may consist of composition material including, for example, cast iron chips molded with a binding medium comprising rubber and a resin. A composition suitable for use in a molded type brake shoe is disclosed, for example, in U.S. Patent No. 2,686,140, issued to C. L. E. De Gaugue, Jr., on August 10, 1954. Molded brake shoes have the advantage of more uniform friction characteristics under all climatic conditions than do cast iron shoes.

Tests conducted with the molded type brake shoes show that, for obtaining substantially corresponding braking effect, approximately one-fourth of the actuating force is required for the molded shoes as is required for the cast iron brake shoe commonly in use at present. Such tests indicate that the actuating force delivered by the presently existing brake cylinders and brake rigging is far in excess of what is necessary for the molded type brake shoe. Simply using less fluid pressure or reducing the size of the brake cylinders to reduce the braking force would introduce complications because of pressure equalization problems incident to the use with existing fluid pressure brake control valves. Moreover, modification or complete replacement of existing fluid pressure brake control equipment and brake rigging, to conform to the requirements of the molded type brake shoe, would be very costly and economically would not warrant the changeover to molded brake shoes in many cases.

Accordingly, it is an object of my invention to provide a simple and relatively inexpensive device for effecting a conversion of existing brake cylinders so as to adapt said existing cylinders to deliver the proper amount of actuating force to the molded type brake shoe without interfering with the proper operation of the existing pneumatic brake control equipment.

Another object of my invention is to provide a brake cylinder device, for use with molded type brake shoes, which cylinder is of substantially the same equalizing volume as existing brake cylinder devices and therefore requires no change in break pipe pressure or of auxiliary reservoir volume of existing air brake control systems, thus making it possible to intermix, in a train, cars equipped with the converted brake cylinders and the molded brake shoes and cars having the old type brake cylinders and cast iron shoes.

Another object of my invention is to provide a brake cylinder device capable of producing a lesser braking force in response to a given fluid pressure than existing brake cylinders without any substantial change in the expansion or pressure equalization volume of the cylinder.

Figure 2:
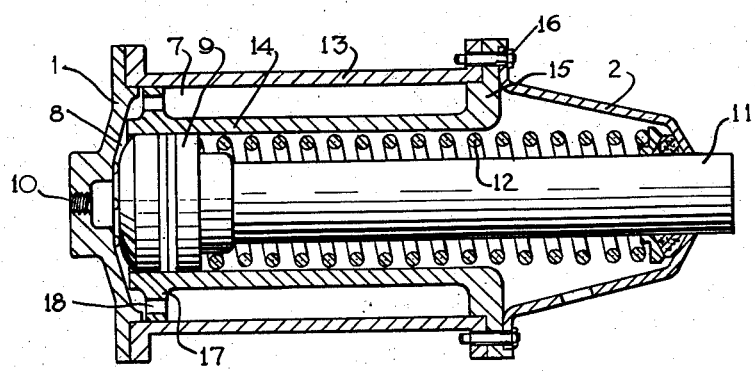

Other objects and advantages of my invention will become evident from the following more detailed description thereof when read in conjunction with the accompanying drawing, in which:

Fig. 1 is an elevational view, mainly in section, of a brake cylinder device embodying one form of my invention, and Fig. 2 is an elevational view, mainly in section, of a brake cylinder device embodying another form of the invention.

*Description and operation*

The usual form of the brake cylinder employed in fluid pressure brake systems for railroad cars and trains is designed at such size and dimensions in relation to the volume of the auxiliary reservoir that a certain ratio exists between the pressure established in the brake cylinder, by flow of fluid under pressure from the auxiliary reservoir under the control of the triple valve device or equivalent valve devices, and the amount of reduction from the normal pressure carried in the brake pipe, such brake pipe pressure reduction effecting operation of the triple valve to cause fluid under pressure to be supplied from the auxiliary reservoir to the brake cylinder to effect a brake application. The maximum pressure attainable in the brake cylinder is the pressure of equalization between the auxiliary reservoir and the brake cylinder. Any change in the volume of the pressure chamber of the brake cylinder thus directly affects the degree of brake application attained.

In carrying out the objects of my invention, therefore, I provide a brake cylinder device which corresponds in outward appearance and size to conventional brake cylinders, but which differs therefrom in respects to be hereinafter pointed out.

Referring to Fig. 1, one form of a brake cylinder device embodying my invention comprises the usual pressure head 1 and a non-pressure head 2 but differs from conventional brake cylinders in having a cylindrical body shell 3, to which said pressure and non-pressure heads are secured in customary manner, and which body shell 3 has not merely an outer cylindrical wall 4 but also an inner cylinder 5 supported concentrically within the outer wall. The inner cylinder 5 is joined to the outer wall 4, as by being cast integrally therewith, through a radial wall 6 at the end adjacent the non-pressure head 2, thus providing an annular space or chamber 7 between said outer wall 4 and cylinder 5 in open communication with a pressure chamber 8 directly behind the pressure head 1. The combined volumes of chambers 7 and 8 and of cylinder 5 are very substantially the equivalent volume of a conventional brake cylinder at the brake application position of the brake cylinder piston.

According to my invention, I also provide a smaller than conventional piston 9 coaxially disposed within the cylinder 5, said piston normally occupying a brake release position adjacent the pressure head 1, in which position the brakes on the vehicle wheels are released. When fluid pressure is supplied to chamber 8 through a conduit (not shown) connected to a threaded opening 10 in the pressure head 1, the piston 9 is slidably shifted by such fluid pressure in the direction of the right hand, as viewed in the drawing, toward a brake application position in which brake shoes (not shown) are actuated, through brake rigging (not shown), as effected by a piston rod 11 extending coaxially from one face of the piston 9 and exteriorly of the casing through the non-pressure head 2 to connect to said brake rigging. A spring 12, similar to the usual release spring, is interposed in the cylinder 5 between the piston 9 and the non-pressure head 2 for biasing the piston 9 to its brake release position when fluid pressure is released from chamber 8.

Such supply and release of fluid pressure to and from, respectively, chamber 8, as previously noted, is effected by the usual triple valve responsively to reduction from and restoration to normal, respectively, of brake pipe pressure.

It will be noted that by providing the brake cylinder device with the inner cylinder 5, a smaller internal diameter of the cylinder device is thus obtained and the piston 9 is accordingly smaller than the piston found in the old type brake cylinder devices. Therefore, the force exerted by the piston 9 on the brake shoes, as compared to the old type piston, is reduced without reducing the equalizing volume of the brake cylinder device, because chamber 7, along with chamber 8 and the volume of cylinder 5, with the piston 9 displaced to its application position, as previously noted, provides a volume in my brake cylinder device substantially equivalent to the volume of the old type brake cylinder device. By retaining substantially the same cylinder volume it is thus possible to retain the same auxiliary reservoir volume and pressure and the same associated devices for effecting supply of fluid under pressure from said reservoir to the brake cylinder.

The embodiment of the invention represented by Fig. 2 differs from that in Fig. 1 only in that the brake cylinder device comprises the conventional external cylindrical outer wall 13 and a separate inner cylindrical portion, or adapter, 14 corresponding to the outer wall 4 and the inner cylinder 5, respectively, in Fig. 1. Adapter 14, however, is provided with a radially extending flange 15 at the end adjacent non-pressure head 2, by which flange said adapter 14 may be secured by bolts 16 between the outer wall 13 and the non-pressure head 2. Adapter 14 is also provided at the end opposite flange 15 with another flange 17 for centrally and coaxially supporting said adapter within the outer wall 13. Spaced apart openings 18 in the flange 17 provide for communication between chamber 7, chamber 8 and opening 10.

This form of the invention represented in Fig. 2 permits adapting the old type brake cylinder device for use with molded type brake shoes by simply inserting the adapter 14 and providing the smaller piston 9. As above noted, in connection with the embodiment shown in Fig. 1, substantially the same equalizing volume as the old type brake cylinder is thus retained.

It will be apparent that my invention may be utilized to convert existing cylinders or that entirely new cylinders may be constructed in accordance therewith.

Having now described my invention, what I claim as new and desire to secure by Letters Patent, is:

1. A conversion element for use with existing brake cylinder devices of the type comprising a cylindrical body portion having secured coaxially thereto, at its respective ends, a pressure head and a non-pressure head, said cylindrical body portion normally having coaxially operable therein a piston of a diameter corresponding to the internal diameter of the cylindrical body portion, said element comprising an outer cylindrical section corresponding in length and outer diameter to said cylindrical body portion, an inner cylindrical section integrally joined at one end to and supported concentrically within said outer cylindrical section, and a flange at each end of the outer cylindrical section of said liner whereby the element may be secured between said pressure head and said non-pressure head in place of said existing cylindrical body portion, said inner cylindrical section being of such internal diameter as to receive therein a piston of desired smaller diameter than that of the first said piston in substitution for the first said piston.

2. A conversion element for use with existing brake cylinder devices of the type comprising a pressure head, a non-pressure head and a cylindrical body portion secured coaxially therebetween, said cylindrical body portion normally having coaxially operable therein a piston of a diameter corresponding to the internal diameter of the cylindrical body portion, said element comprising a cylindrical body section of smaller diameter than said cylindrical body portion, a first flange formed integrally at one end of said element and being securable, upon removal of said piston, between said non-pressure head and the end of said cylindrical body portion adjacent said non-pressure head for supporting said element in concentric relation with said body portion, and a second flange formed integrally at the other end of said element, which second flange engages the inner surface of said cylindrical body portion for additionally supporting said element concentrically within the cylindrical body portion, said element being adapted to receive and have operable therein a piston of diameter smaller than that of the first said piston.

References Cited in the file of this patent

UNITED STATES PATENTS

| 767,526 | Paulson | Aug. 16, 1904 |
| 2,277,124 | Maliphant et al., | Mar. 24, 1942 |

FOREIGN PATENTS

| 39,695 | Sweden | Dec. 1, 1915 |
| 395,400 | Germany | May 8, 1924 |